United States Patent
Nainar et al.

(10) Patent No.: US 12,088,628 B2
(45) Date of Patent: Sep. 10, 2024

(54) CROSS-PLANE MONITORING INTENT AND POLICY INSTANTIATION FOR NETWORK ANALYTICS AND ASSURANCE

(71) Applicant: Cisco Technology, Inc., San Jose, CA (US)

(72) Inventors: Nagendra Kumar Nainar, Morrisville, NC (US); Carlos M. Pignataro, Raleigh, NC (US); Rahul Rammanohar, Bangalore (IN); Kondaveeti Lakshmi Ganesh, Andhra Pradesh (IN); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 17/497,079

(22) Filed: Oct. 8, 2021

(65) Prior Publication Data
US 2023/0112101 A1    Apr. 13, 2023

(51) Int. Cl.
*H04L 9/40*    (2022.01)
(52) U.S. Cl.
CPC .......... *H04L 63/20* (2013.01); *H04L 63/0876* (2013.01); *H04L 63/10* (2013.01); *H04L 63/1408* (2013.01)
(58) Field of Classification Search
CPC ..... H04L 63/20; H04L 63/0876; H04L 63/10; H04L 63/1408
See application file for complete search history.

(56) References Cited

U.S. PATENT DOCUMENTS

| | | | |
|---|---|---|---|
| 2007/0032989 A1* | 2/2007 | Hodges | G06F 16/9577 |
| | | | 702/188 |
| 2016/0065419 A1 | 3/2016 | Szilagyi et al. | |
| 2017/0372383 A1 | 12/2017 | Ezekiel | |
| 2018/0248963 A1 | 8/2018 | Weis et al. | |
| 2020/0007405 A1* | 1/2020 | Chitalia | G06F 9/5072 |
| 2020/0126112 A1 | 4/2020 | Leonard et al. | |
| 2020/0366576 A1 | 11/2020 | Leboyer et al. | |
| 2022/0021738 A1* | 1/2022 | Patel | H04L 43/0876 |

(Continued)

OTHER PUBLICATIONS

Vestin, et al., "Programmable Event Detection for In-Band Network Telemetry", 2019 IEEE 8th International Conference on Cloud Networking (CloudNet), Nov. 2019, 6 pages, IEEE, Coimbra, Portugal.

(Continued)

*Primary Examiner* — Thaddeus J Plecha
(74) *Attorney, Agent, or Firm* — BEHMKE INNOVATION GROUP LLC; James M. Behmke; James J. Wong (57) ABSTRACT

In one embodiment, an access policy enforcement service receives a user authentication request from an end-user device. The access policy enforcement service identifies a telemetry collection intent from the user authentication request. The access policy enforcement service determines a monitoring policy based on the telemetry collection intent identified from the user authentication request. The access policy enforcement service configures, according to the monitoring policy, one or more telemetry collection agents to collect telemetry for traffic associated with the end-user device.

20 Claims, 8 Drawing Sheets

(56) References Cited

U.S. PATENT DOCUMENTS

2022/0058042 A1* 2/2022 Vanjare .............. G06F 9/45558

OTHER PUBLICATIONS

Cordova-Garcia, Jose, "Sparse Control and Data Plane Telemetry Features for BGP Anomaly Detection", IEEE INFOCOM 2019—IEEE Conference on Computer Communications Workshops (INFOCOM WKSHPS), May 2019, 6 pages, IEEE, Paris, France.
Nainar, et al., "Data Plane Signaled On-Demand Cloud Telemetry and Traffic Mirroring Configuration and Collection", Defensive Publication Series, Dec. 2020, 8 pages, Technical Disclosure Commons.

\* cited by examiner

CROSS-PLANE MONITORING INTENT AND POLICY INSTANTIATION FOR NETWORK ANALYTICS AND ASSURANCE

TECHNICAL FIELD

The present disclosure relates generally to computer systems, and, more particularly, to cross-plane monitoring intent and policy instantiation for network analytics and assurance.

BACKGROUND

The Internet and the World Wide Web have enabled the proliferation of web services and application available for virtually all types of businesses. In order to address these business demands, the industry is now strongly focused on building application-centric infrastructure by leveraging (or introducing) new capabilities to improve the overall end-user application experience. Indeed, technologies such as predictive routing now allow for network strategies to change from being proactive to being predictive, using machine learning.

A key criterion to ensure end-user application experience in both proactive and predictive systems is the collection of the telemetry data needed to support their decisions. While various monitoring solutions are available, it is often the case that there are still gaps in the end-to-end measurements. Even in instances where full visibility is possible across the different network planes (e.g., the data plane, the control plane, etc.), doing so for every online application and for every user session is not practical for reasons of scale. In addition, these monitoring solutions require significant policy configuration to function and are not user-centric.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an access policy enforcement service receives a user authentication request from an end-user device. The access policy enforcement service identifies a telemetry collection intent from the user authentication request. The access policy enforcement service determines a monitoring policy based on the telemetry collection intent identified from the user authentication request. The access policy enforcement service configures, according to the monitoring policy, one or more telemetry collection agents to collect telemetry for traffic associated with the end-user device.

Other embodiments are described below and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
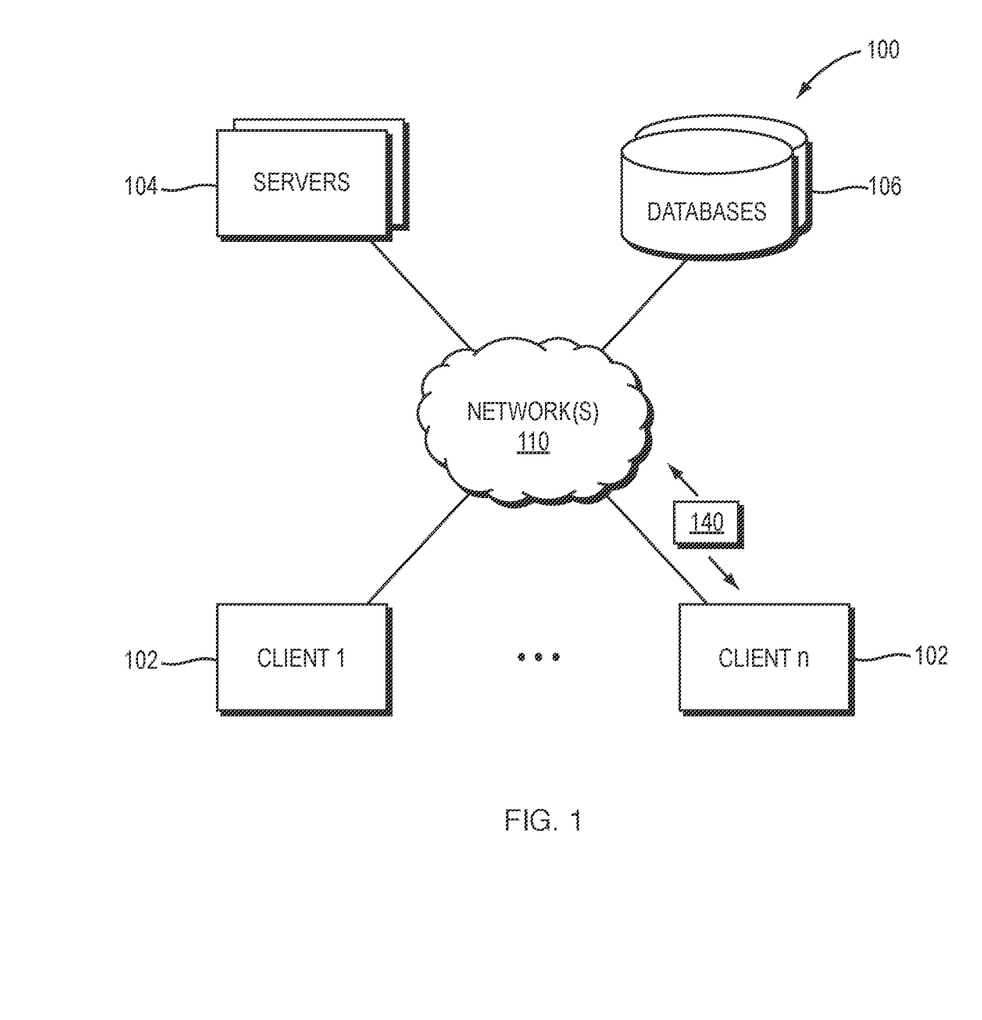
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on Wi-Fi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
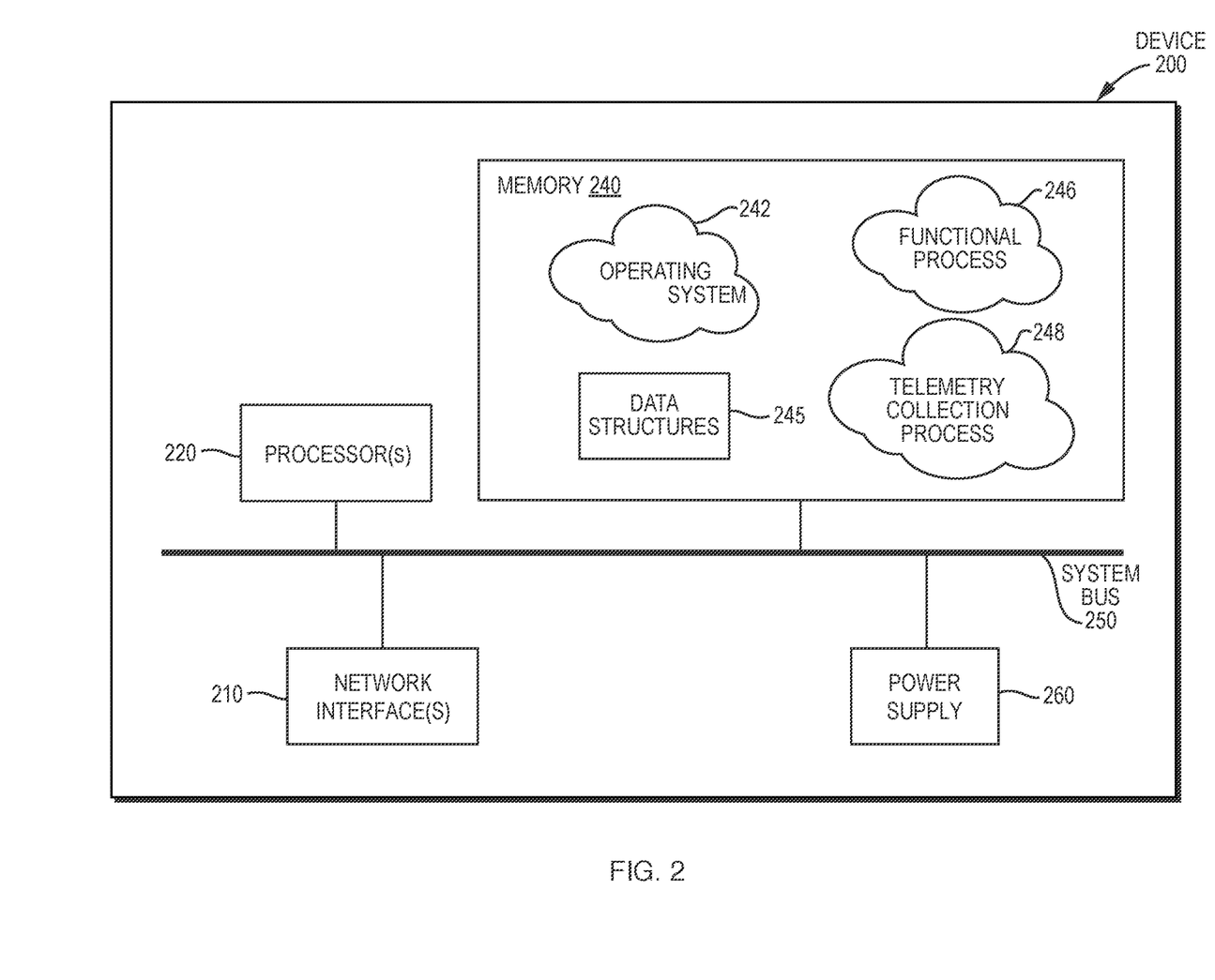
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative access policy enforcement process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems or identifying potential or active security threats can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
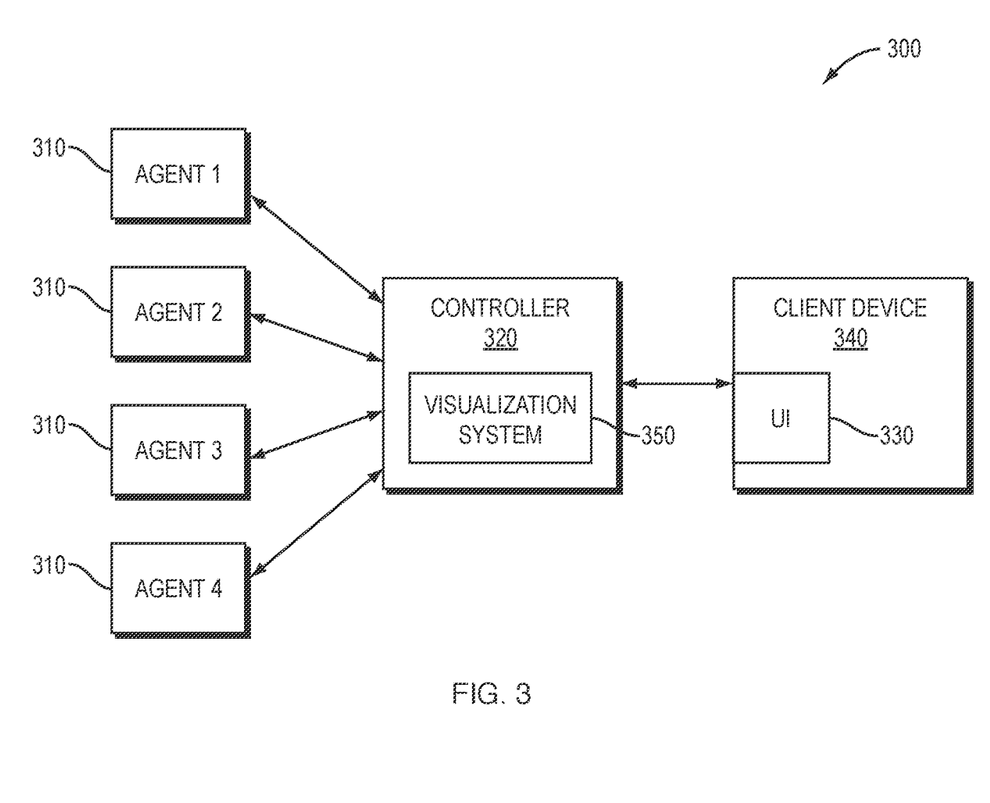
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of a controller 320 may be hosted remotely by a provider of the observability intelligence platform 300. In an illustrative on-premises (On-Prem) implementation, an instance of a controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Cross-Plane Monitoring Intent and Policy
Instantiation for Network Analytics and Assurance As noted above, in order to address the increasing demands with respect to online applications/services, the industry is now strongly focused on building application-centric infrastructure by leveraging (or introducing) new capabilities to improve the overall end-user application experience. Indeed, technologies such as predictive routing now allow for network strategies to change from being proactive to being predictive, using machine learning.

A key criterion to ensure end-user application experience in both proactive and predictive systems is the collection of the telemetry data needed to support their decisions. While various monitoring solutions are available, such as AppDynamics, ThousandEyes, and the like, it is often the case that there are still gaps in the end-to-end measurements. Even in instances where full visibility is possible across the different network planes (e.g., the data plane, the control plane, etc.), doing so for every online application and for every user session is not practical for reasons of scale. In addition, these monitoring solutions require significant policy configuration to function and are not user-centric.

Specifically, according to one or more embodiments described herein, an access policy enforcement service receives a user authentication request from an end-user device. The access policy enforcement service identifies a telemetry collection intent from the user authentication request. The access policy enforcement service determines a monitoring policy based on the telemetry collection intent identified from the user authentication request. The access policy enforcement service configures, according to the monitoring policy, one or more telemetry collection agents to collect telemetry for traffic associated with the end-user device.

Operationally, the techniques introduced herein tie the telemetry collection intent for a particular user across the various network plane (e.g., control plane, data plane, etc.) to the network onboarding process for that user. In further aspects, the techniques herein also introduce the concept of cross-pollinating the telemetry collection intent across the various network planes by leveraging header signaling and augmented local state entries, to correlate the telemetry data across the different layers and/or telemetry collection agents.

Figure 4:
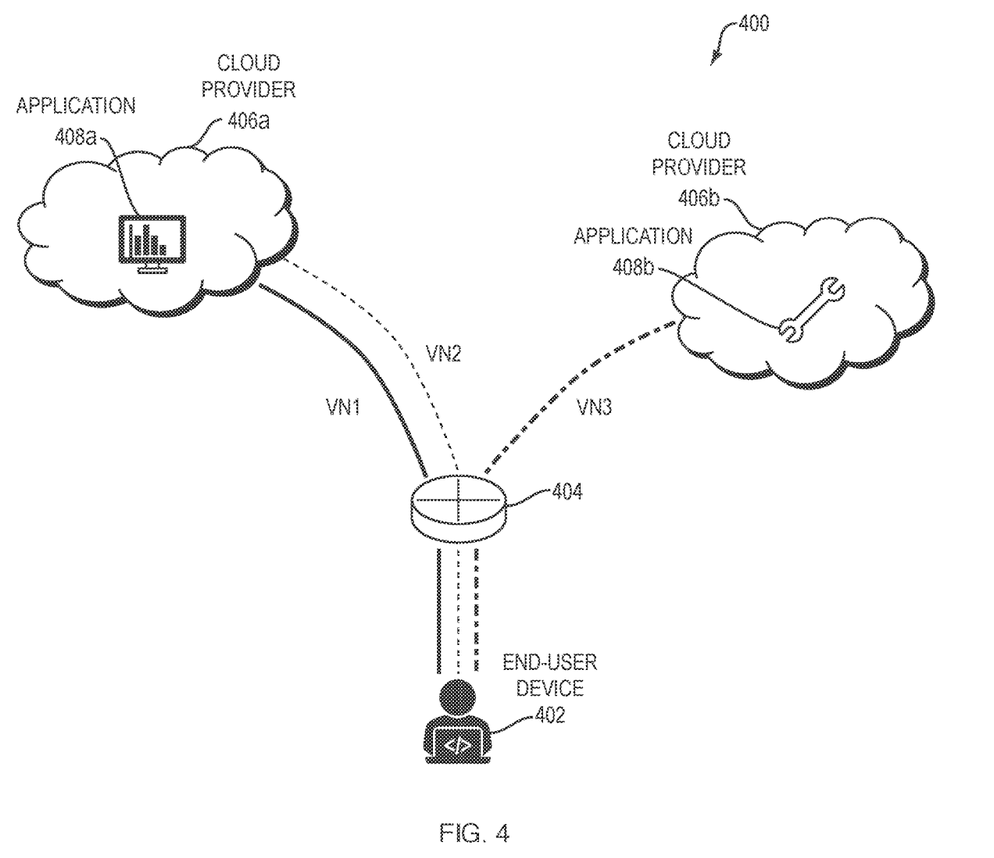
FIG. 4 illustrates an example of an end-user device accessing online applications/services.

FIG. 4 illustrates an example 400 of an end-user device accessing online applications/services, according to various embodiments. As shown, consider the case of an end-user device 402 that will be used to access various online applications, such as application 408a and application 408b hosted by cloud provider 406a and cloud provider 406b, respectively. For instance, cloud providers 406a-406b may take the form of Amazon Web Services (AWS), Google Cloud, Microsoft Azure, an on-prem cloud, or other form of cloud provider that may host an online application.

In some embodiments, connectivity between end-user device 402 and cloud providers 406a-406b may be achieved through the use of a software-defined architecture (SDA)/Ethernet Virtual Private Network (EVPN) connections, as facilitated by edge device 404. Thus, when the user of end-user device 402 onboards to the local network, end-user device 402 may perform an authentication/authorization operation with the network, to determine the access policies, virtual network (VN) selection, and the like, for end-user device 402. In some cases, a timer-based policy can also be applied for the user and renew the access policies based on further authentication or other information.

For instance, as shown, if end-user device 402 onboards to VN1, an access policy1 may be applied to it, if end-user device 402 onboards to VN2, an access policy2 may be applied to it, etc. More specifically, as part of the onboarding process, end-user device 402 may be assign security group tags (SGTs) or policies, endpoint groups (EPGs), etc., during its onboarding. The positioning of the VN will further control the amount of access allowed for the user of end-user device 402. For instance, when end-user device 402 is positioned in VN1, it may be allowed to communicate with cloud provider 406a, but not with cloud provider 406b.

To ensure end-user application experience for the user of end-user device 402, there needs to be a way to collect control plane telemetry data (e.g., the reason behind positioning the user in VN1, state entries created in different edge/remote devices, policy states created on different edge/remote devices, etc.) and data plane telemetry data (e.g., packet capture, NetFlow stats, etc.), in a manner that is focused on the end user involved. In addition, the telemetry collection mechanism should be dynamic and operate in a way that expresses the intent of the network administrator or engineer, to support end-user device 402 in the network.

In other words, the following questions need to be answered, for there to be sufficient telemetry collection to ensure acceptable application experience for the user of end-user device 402:

Are the relevant monitoring/telemetry collection agents enabled at the right points in the network, such as on the connected edge device(s), remote cloud service(s), etc.?

Are the relevant test cases instantiated between such agents (e.g., to measure path metrics and performance)?

When end-user device 402 roams from one edge to another edge, should the configured agents and/or monitoring policies change?

To address the above, the techniques herein propose a user-centric way to collect telemetry data across the various network planes, by signaling the telemetry collection intent as part of the onboarding process for an end-user device, such as end-user device 402.

Figure 5:
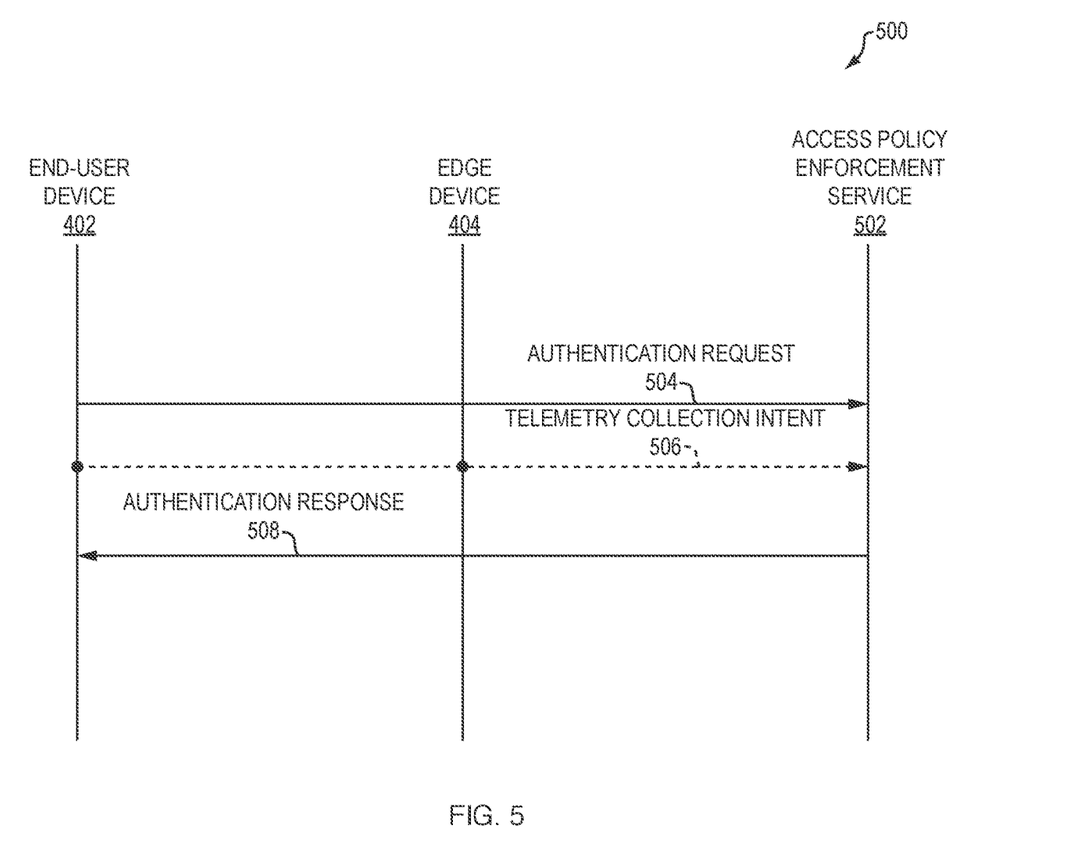
FIG. 5 illustrates an example of signaling a telemetry collection request via a user authentication request.

FIG. 5 illustrates an example 500 of signaling a telemetry collection request via a user authentication request, according to various embodiments. As shown, assume that end-user device 402 sends a user authentication request 504 to an access policy enforcement service 502 as part of its onboarding. As noted, user authentication request 504 may typically be used to drive security policies and the like for end-user device 402, as well as an authentication response 508 back to end-user device 402.

In various embodiments, the techniques herein further propose user authentication request 504 being used to signal the telemetry collection intent 506 for the end-user and their end-user device 402.

For instance, telemetry collection intent 506 may take the form:

```
User 1{
    collect control-plane;
    collect data-plane;
    capture packet-from-user;
    capture packet-to-user;
    capture packet-bidir-user;
    measure TCP-to-Cloud1-App1;
    measure TCP-to-Cloud1-App2;
    ...
}
```

In other word, telemetry collection intent 506 may specify for which network planes telemetry should be collected for that user (e.g., control, data etc.), any packet capture policies, any probing/testing policies, etc. In addition, any such telemetry collection actions specified by telemetry collection intent 506 may be on a per-application basis, as well, in some embodiments. For example, path probing/testing may only be specified for a particular cloud provider and/or cloud-hosted application.

According to various embodiments, telemetry collection intent 506 may be signaled by end-user device 402, edge device 404, or even inferred by access policy enforcement service 502. For instance, end-user device 402 or edge device 404 may insert telemetry collection intent 506 into user authentication request 504. In the case in which telemetry collection intent 506 is signaled by end-user device 402, it may be included in user authentication request 504 as part of a header type-length-value (TLV) flag, shim-header, or the like.

In the case in which telemetry collection intent 506 is signaled by edge device 404, edge device 404 may maintain minimal policies that it uses to signal telemetry collection intent 506 to access policy enforcement service 502. Finally, in the case in which telemetry collection intent 506 is defined/inferred by access policy enforcement service 502, access policy enforcement service 502 may do so based on the identity of the user associated with user authentication request 504. In some embodiments, this intent mapping may be on a per-user, per-profile, or per-site basis, as well.

In some embodiments, telemetry collection intent 506 can be further decomposed into a variety of monitoring attributes, such as any or all of the following:

Collect initial onboarding telemetry data

Collect all the above+data plane telemetry data

Collect all the above+packet capture for x timer

Collect all the above and instantiate monitoring agents for continuous monitoring Collect all the above and push telemetry collection/monitoring agents to end-user device 402

More specific examples of how telemetry collection intent 506 could be signaled to access policy enforcement service 502 include a new TLV in the Extensible Authentication Protocol (EAP) or Remote Authentication Dial-In User payload of user authentication request 504, in an iOAM message, in a control plane header or payload, or the like.

Based on telemetry collection intent 506, access policy enforcement service 502 may determine a monitoring policy for end-user device 402 that specifies which telemetry data to collect, where the telemetry data should be collected, and/or whether any test cases should be instantiated.

Figure 6:
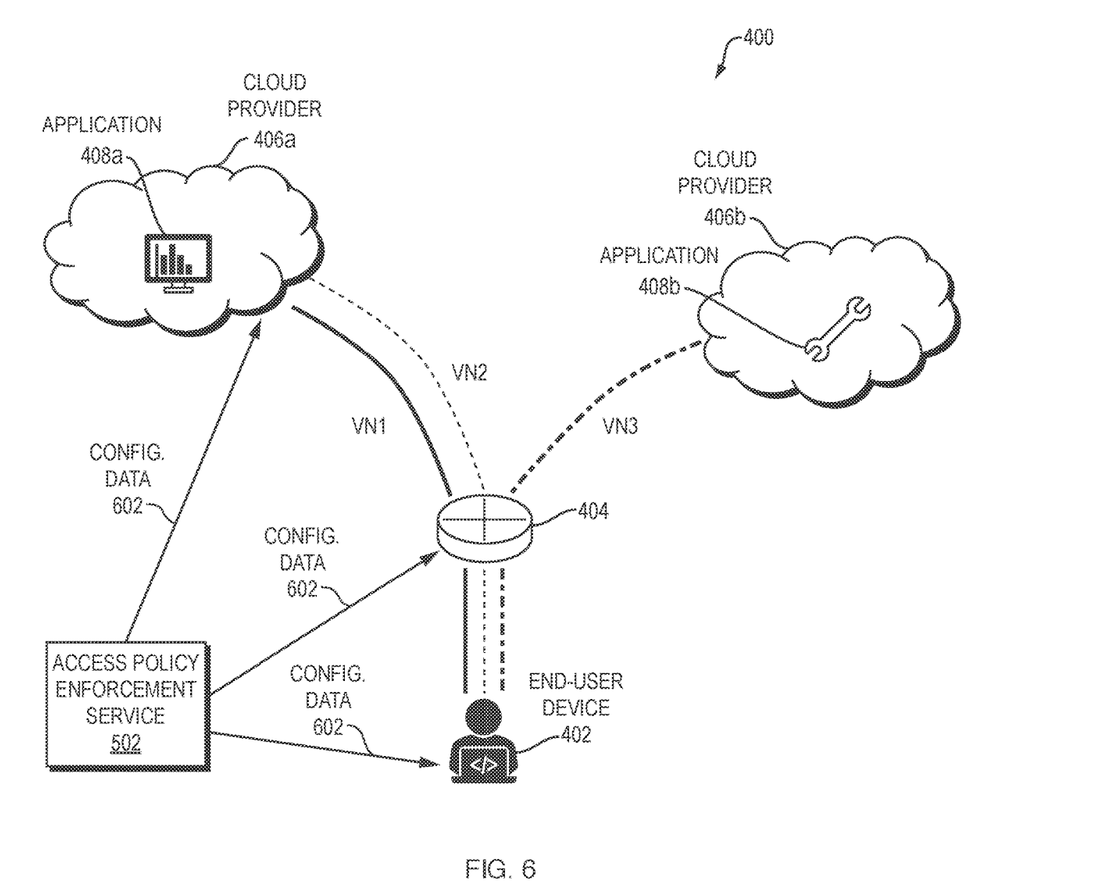
FIG. 6 illustrates an example of an access policy enforcement service configuring telemetry collection agents.

FIG. 6 illustrates an example of an access policy enforcement service configuring telemetry collection agents, according to various embodiments. Continuing the examples in FIGS. 4-5, assume that end-user device 402 has signaled a telemetry collection intent to access policy enforcement service 502 as part of its onboarding and that access policy enforcement service 502 has determined a corresponding monitoring policy for end-user device 402 and its user.

Based on the determined monitoring policy, access policy enforcement service 502 may configure the relevant monitoring/telemetry collection agents in the network, accordingly, in various embodiments. For instance, access policy enforcement service 502 may send configuration data 602 to any or all of the following: end-user device 402, edge device 404, and/or a device of cloud provider 406a, such as an ingress or egress device as the edge of cloud provider 406a. Thus, configuration data 602 may specify to the receiving monitoring agents at those location(s) what types of traffic telemetry should be collected. In further embodiments, configuration data 602 may also cause a relevant monitoring agent to be instantiated at a given location, if such a monitoring agent is not already existing.

For example, assume that configuration data 602 specifies that telemetry data should be collected for all TCP connections between a particular user (e.g., the user of end-user device 402) with a specific online application, such as application 408a. In such a case, access policy enforcement service 502 may perform the following verifications during its configuration operations:

Determine whether edge device 404 is running a monitoring agent (e.g., a ThousandEyes agent or the like).

Determine whether end-user device 402 is running a monitoring agent (e.g., an AppDynamics agent or the like).

Determine whether application 408a is running a monitoring agent (e.g., an AppDynamics agent or the like).

Determine whether an existing TCP test case exists between any existing monitoring agents.

Based on the above, access policy enforcement service 502 may dynamically instantiate any needed monitoring agents and/or test cases.

Figure 7:
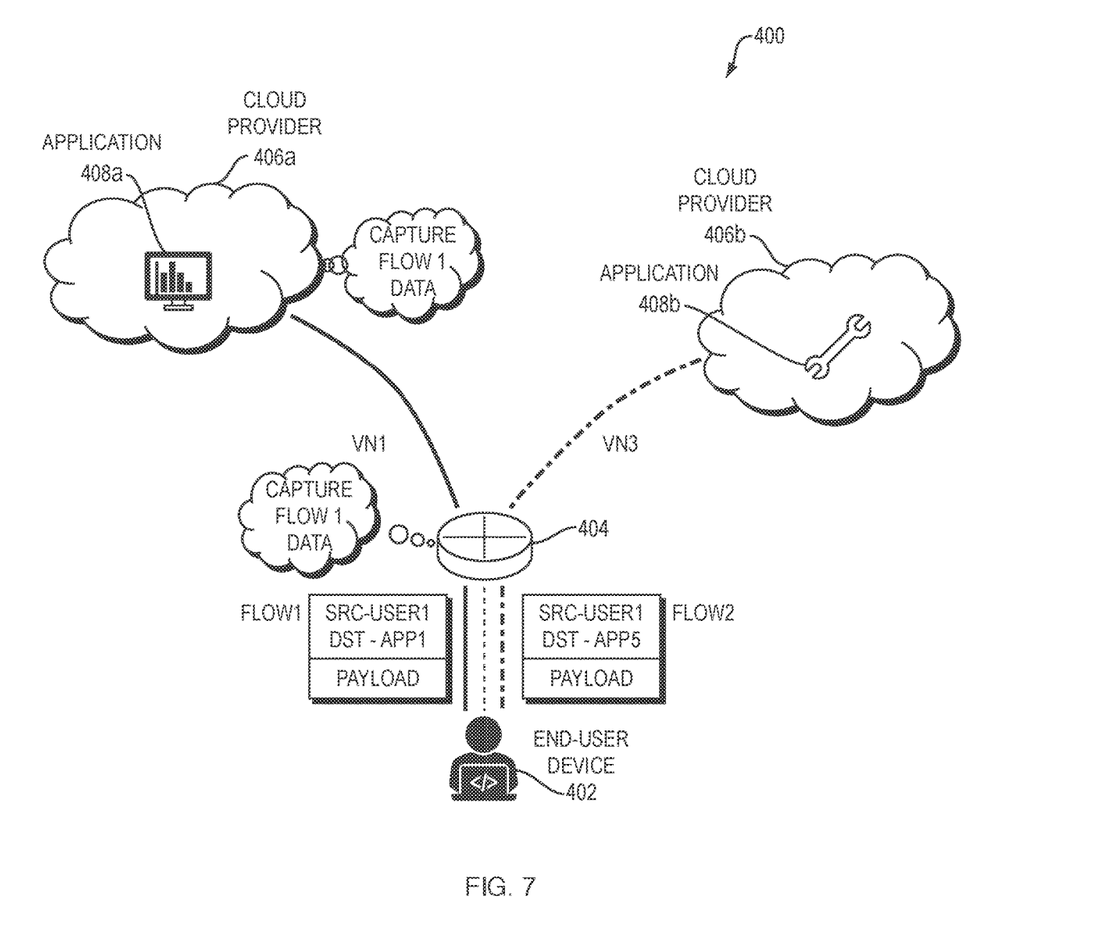
FIG. 7 illustrates an example of the collection of telemetry for traffic associated with an end-user device.

FIG. 7 illustrates an example of the collection of telemetry for traffic associated with an end-user device, according to various embodiments. Continuing the previous examples, assume now that monitoring agents have been successfully configured at end-user device 402, edge device 404, and application 408a, with the specific configuration requiring that TCP traffic between end-user device 402 and application 408a be monitored and telemetry captured therefrom. The cumulative data collected from doing so will provide end-to-end visibility into why the user is positioned in the VN, why the traffic profile/policy is pushed for this user, and finally assurance based on the monitoring results.

Thus, as shown, any control/data plane activities triggered related to the user of end-user device 402 will be collected with respect to application 408a. For example, any ARP request or ARP refresh from end-user device 402 will be collected and logged. Note that the telemetry collection is also done according to policy, meaning that the traffic flow must match the configured policy for the telemetry to be captured or a specific test to be performed (e.g., path probing, etc.). For instance, while the telemetry collection agent of edge device 404 may capture telemetry data for the first flow between end-user device 402 and application 408a, it may not capture similar telemetry for a second traffic flow between end-user device 402 and application 408b.

In some embodiments, if a traffic flow is bidirectional, the intent may further be signaled in the packet header to the remote node, to capture the packet on the remote node, as well. For instance, edge device 404 may indicate in a packet header to application 408a that its telemetry collection agent should likewise capture the packet and/or flow data for reporting.

In another embodiment, when an end-user device moves from one edge to another edge, the relevant agents and/or the test cases may be moved along with the user for continuous monitoring. Thus, if end-user device 402 moves to a different edge device than edge device 404, access policy enforcement service 502 may propagate the intent-driven telemetry collection configurations to the relevant agents.

In summary, the techniques herein provide for the ability to dynamically monitor the user experience, all the way from initial onboarding through detailed operation and use, in a flexible manner that is intent-based and focused or the user and/or thing involved. As such, the techniques herein provide a valuable resource for tracking, validating, and maximizing user experience.

More specifically, the techniques herein allow for the telemetry collection intent to be signaled in the in the control-plane signaling messages. This signaling may also be included by the end-user or injected on behalf of the user, such as by an edge device. In addition, the techniques herein provide the ability to signal the granularity of the telemetry to be collected (e.g., control plane vs. policy plane vs. data plane vs. all, etc.). New semantics are also introduced herein on the controller (e.g., an access policy enforcement service) to interpret the intent and compose the policies to instantiate on relevant nodes for data collection. In further aspects, the techniques herein can also augment data plane state entries (time-based or event-based) to signal the intent further to collect data-plane related telemetry (packet capture, ARP sniffer, TE Agent monitoring, etc.). This allows nodes across the network to be able to react to the control/data plane intent and collect the relevant telemetry data.

Figure 8:
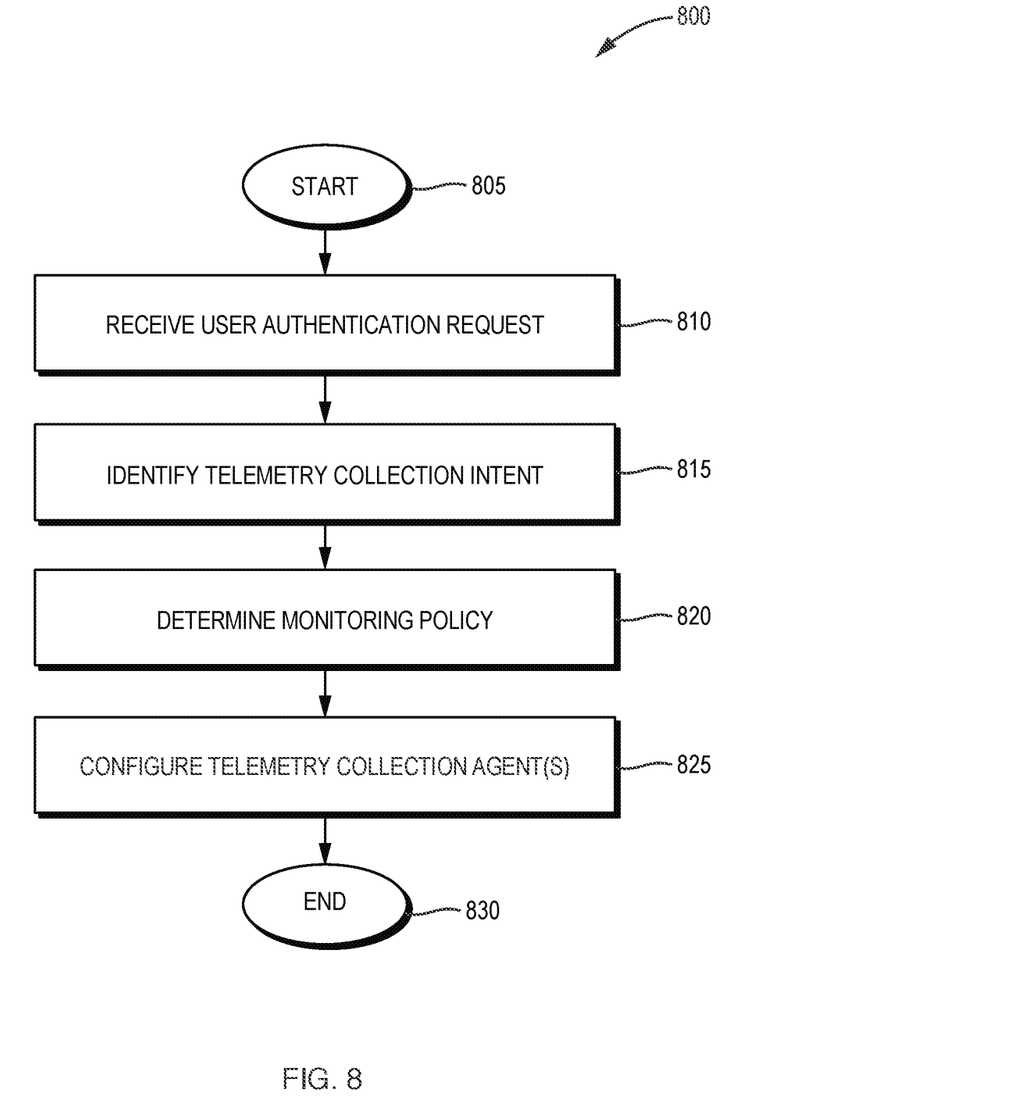
FIG. 8 illustrates an example simplified procedure for configuring one or more telemetry collection agents in a user-centric manner, in accordance with one or more embodiments described herein.

In closing, FIG. 8 illustrates an example simplified procedure for configuring one or more telemetry collection agents in a user-centric manner, in accordance with one or more embodiments described herein. For example, a non-generic, specifically configured device (e.g., device 200) may perform procedure 800 by executing stored instructions (e.g., illustrative access policy enforcement process 248), such as to provide an access policy enforcement service to a network. The procedure 800 may start at step 805, and continues to step 810, where, as described in greater detail above, the device may receive a user authentication request from an end-user device.

At step 815, as detailed above, the device may identify a telemetry collection intent from the user authentication request. In some embodiments, the device may do so by extracting the telemetry collection intent from the user authentication request. In one embodiment, the end-user device inserts the telemetry collection intent into the user authentication request. In another embodiment, an edge device inserts the telemetry collection intent into the user authentication request.

At step 820, the device may determine a monitoring policy based on the telemetry collection intent identified from the user authentication request, as described in greater detail above. For instance, the monitoring policy may specify that that a particular type of telemetry should be captured for traffic associated with the end-user device and a specified online application. In other instances, the monitoring policy may specify whether certain packets should be captured, whether certain tests should be performed (e.g., path probing, etc.), or the like.

At step 825, as detailed above, the device may configure, according to the monitoring policy, one or more telemetry collection agents to collect telemetry for traffic associated with the end-user device. In one embodiment, this may entail configuring the one or more telemetry collection agents to collect control plane telemetry and data plane telemetry for the traffic associated with the end-user device. In another embodiment, this may entail configuring the one or more telemetry collection agents to perform a test of a network path used by the traffic.

The simplified procedure 800 may then end in step 830, notably with the ability to continue ingesting and processing data.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, the techniques described herein may be performed by hardware, software, and/or firmware, such as in accordance with the illustrative access policy enforcement process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise identifying, by the access policy enforcement service, a telemetry collection intent from the user authentication request; determining, by the access policy enforcement service, a monitoring policy based on the telemetry collection intent identified from the user authentication request; and configuring, by the access policy enforcement service and according to the monitoring policy, one or more telemetry collection agents to collect telemetry for traffic associated with the end-user device.

In one embodiment, identifying the telemetry collection intent from the user authentication request comprises: extracting the telemetry collection intent from the user authentication request. In another embodiment, the end-user device inserts the telemetry collection intent into the user authentication request. In a further embodiment, an edge device inserts the telemetry collection intent into the user authentication request. In an additional embodiment, configuring the one or more telemetry collection agents to collect telemetry for traffic associated with the end-user device comprises: configuring the one or more telemetry collection agents to collect control plane telemetry and data plane telemetry for the traffic associated with the end-user device. In another embodiment, configuring the one or more telemetry collection agents to collect telemetry for traffic associated with the end-user device comprises: configuring the one or more telemetry collection agents to capture packets from the traffic associated with the end-user device. In a further embodiment, configuring the one or more telemetry collection agents to collect telemetry for traffic associated with the end-user device comprises: configuring the one or more telemetry collection agents to perform a test of a network path used by the traffic. In yet another embodiment, the monitoring policy specifies that a particular type of telemetry should be captured for traffic associated with the end-user device and a specified online application. In a further embodiment, at least one of the one or more telemetry collection agents is executed by an edge device. In yet another embodiment, at least one of the one or more telemetry collection agents is a cloud-hosted telemetry collection agent.

According to the embodiments herein, a tangible, non-transitory, computer-readable medium herein may have computer-executable instructions stored thereon that cause a device to perform a process comprising: receiving a user authentication request from an end-user device; identifying a telemetry collection intent from the user authentication request; determining a monitoring policy based on the telemetry collection intent identified from the user authentication request; and configuring, according to the monitoring policy, one or more telemetry collection agents to collect telemetry for traffic associated with the end-user device.

Further, according to the embodiments herein an apparatus herein may comprise: a network interface to communicate with a computer network; a processor coupled to the network interface and configured to execute one or more processes; and a memory configured to store a process that is executable by the processor, the process, when executed, configured to: receive a user authentication request from an end-user device; identify a telemetry collection intent from the user authentication request; determine a monitoring policy, based on the telemetry collection intent identified from the user authentication request; and configure, according to the monitoring policy, one or more telemetry collection agents to collect telemetry for traffic associated with the end-user device.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at an access policy enforcement service, a user authentication request from an end-user device;
identifying, by the access policy enforcement service, a telemetry collection intent from the user authentication request;
determining, by the access policy enforcement service, a monitoring policy based on the telemetry collection intent identified from the user authentication request; and
configuring, by the access policy enforcement service and according to the monitoring policy, one or more telemetry collection agents to collect telemetry for traffic associated with the end-user device.

2. The method as in claim 1, wherein identifying the telemetry collection intent from the user authentication request comprises:
extracting the telemetry collection intent from the user authentication request.

3. The method as in claim 2, wherein the end-user device inserts the telemetry collection intent into the user authentication request.

4. The method as in claim 2, wherein an edge device inserts the telemetry collection intent into the user authentication request.

5. The method as in claim 1, wherein configuring the one or more telemetry collection agents to collect telemetry for traffic associated with the end-user device comprises:
configuring the one or more telemetry collection agents to collect control plane telemetry and data plane telemetry for the traffic associated with the end-user device.

6. The method as in claim 1, wherein configuring the one or more telemetry collection agents to collect telemetry for traffic associated with the end-user device comprises:
configuring the one or more telemetry collection agents to capture packets from the traffic associated with the end-user device.

7. The method as in claim 1, wherein configuring the one or more telemetry collection agents to collect telemetry for traffic associated with the end-user device comprises:
configuring the one or more telemetry collection agents to perform a test of a network path used by the traffic.

8. The method as in claim 1, wherein the monitoring policy specifies that a particular type of telemetry should be captured for traffic associated with the end-user device and a specified online application.

9. The method as in claim 1, wherein at least one of the one or more telemetry collection agents is executed by an edge device.

10. The method as in claim 1, wherein at least one of the one or more telemetry collection agents is a cloud-hosted telemetry collection agent.

11. An apparatus, comprising:
a network interface to communicate with a computer network;
a processor coupled to the network interface and configured to execute one or more processes; and
a memory configured to store a process that is executed by the processor, the process when executed configured to:
receive a user authentication request from an end-user device;
identify a telemetry collection intent from the user authentication request;
determine a monitoring policy, based on the telemetry collection intent identified from the user authentication request; and
configure, according to the monitoring policy, one or more telemetry collection agents to collect telemetry for traffic associated with the end-user device.

12. The apparatus as in claim 11, wherein the apparatus identifies the telemetry collection intent from the user authentication request by:
extracting the telemetry collection intent from the user authentication request.

13. The apparatus as in claim 12, wherein the end-user device inserts the telemetry collection intent into the user authentication request.

14. The apparatus as in claim 12, wherein an edge device inserts the telemetry collection intent into the user authentication request.

15. The apparatus as in claim 11, wherein the apparatus configures the one or more telemetry collection agents to collect telemetry for traffic associated with the end-user device by:
configuring the one or more telemetry collection agents to collect control plane telemetry and data plane telemetry for the traffic associated with the end-user device.

16. The apparatus as in claim 11, wherein the apparatus configures the one or more telemetry collection agents to collect telemetry for traffic associated with the end-user device by:
configuring the one or more telemetry collection agents to capture packets from the traffic associated with the end-user device.

17. The apparatus as in claim 11, wherein the apparatus configures the one or more telemetry collection agents to collect telemetry for traffic associated with the end-user device by:
configuring the one or more telemetry collection agents to perform a test of a network path used by the traffic.

18. The apparatus as in claim 11, wherein the monitoring policy specifies that a particular type of telemetry should be captured for traffic associated with the end-user device and a specified online application.

19. The apparatus as in claim 11, wherein at least one of the one or more telemetry collection agents is executed by an edge device.

20. A tangible, non-transitory, computer-readable medium storing program instructions that cause a device to execute a process comprising:
receiving a user authentication request from an end-user device;
identifying a telemetry collection intent from the user authentication request;
determining a monitoring policy based on the telemetry collection intent identified from the user authentication request; and
configuring, according to the monitoring policy, one or more telemetry collection agents to collect telemetry for traffic associated with the end-user device.

* * * * *